(12) United States Patent
Mcknight

(10) Patent No.: US 7,362,854 B2
(45) Date of Patent: Apr. 22, 2008

(54) PORTABLE ELECTRONIC DEVICE HAVING INTEGRATED TELEPHONY AND CALENDAR FUNCTIONS

(75) Inventor: Russell F. Mcknight, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 356 days.

(21) Appl. No.: 09/966,533

(22) Filed: Sep. 28, 2001

(65) Prior Publication Data

US 2003/0063732 A1    Apr. 3, 2003

(51) Int. Cl.
*H04M 3/42* (2006.01)
*H04M 3/00* (2006.01)

(52) U.S. Cl. .......................... 379/210.01; 379/207.15; 379/265.01

(58) Field of Classification Search ............................... 379/265.01–265.4, 266.01–266.1, 209.01, 379/88.13, 201.01, 207.15
See application file for complete search history.

(56) References Cited

U.S. PATENT DOCUMENTS

| | | | | |
|---|---|---|---|---|
| 5,625,683 | A | * 4/1997 | Nazanin et al. | 379/355.06 |
| 5,872,841 | A | * 2/1999 | King et al. | 379/210.01 |
| 6,005,870 | A | * 12/1999 | Leung et al. | 370/466 |
| 6,009,398 | A | 12/1999 | Mueller et al. | |
| 6,104,788 | A | 8/2000 | Shaffer et al. | |
| 6,317,593 | B1 | * 11/2001 | Vossler | 455/414.1 |
| 6,427,064 | B1 | * 7/2002 | Henderson | 340/5.1 |
| 6,477,374 | B1 | * 11/2002 | Shaffer et al. | 455/445 |
| 6,631,188 | B1 | * 10/2003 | Sands | 379/215.01 |

(Continued)

FOREIGN PATENT DOCUMENTS

EP    0587950 A1    9/1992

(Continued)

OTHER PUBLICATIONS

.nokiausa.com/beautylandscape/1,2500,14,FF. Nokia Connecting People 9000I Digital, 2001.

(Continued)

*Primary Examiner*—William J. Deane, Jr.
(74) *Attorney, Agent, or Firm*—Jeffrey A. Proehl; Woods Fuller Shultz & Smith PC

(57) ABSTRACT

The phone number or other identifying information of an incoming phone call or other network communication is optionally stored, and a call-back is optionally scheduled. The user is prompted whether to schedule a call back, and if so, a call-back sequence is initiated at an appropriate time. When a call-back sequence is initiated, the scheduled call-back number or address may be automatically dialed, or alternatively the user selects whether to go forward with the call-back routine, at which time the call-back continues if the user selects an affirmative response. As an option, the user can delay the call-back to a predetermined time in the future, or the call-back can be rescheduled or canceled. Associated notes or other text can be saved in a calendar along with the scheduled call-back event to remind the user the reason and subject matter of the call back. The invention provides integrated communications and calendaring features. The invention may be directed to telephony system such as cellular telephones or telephony enabled computers systems, or may be expanded to network communication such as e-mail or network addressing in lieu of telephony communications.

24 Claims, 4 Drawing Sheets

U.S. PATENT DOCUMENTS

| | | | |
|---|---|---|---|
| 6,651,218 B1* | 11/2003 | Adler et al. ............... 715/530 |
| 6,658,106 B1* | 12/2003 | Atkinson et al. ...... 379/265.11 |
| 6,751,307 B2* | 6/2004 | McAlinden ............ 379/201.02 |
| 6,760,423 B1* | 7/2004 | Todd ..................... 379/202.01 |
| 6,763,092 B1* | 7/2004 | Borland .................. 379/88.21 |
| 2002/0052225 A1* | 5/2002 | Davis et al. |
| 2002/0076026 A1* | 6/2002 | Batten |
| 2002/0131565 A1* | 9/2002 | Scheuring et al. |
| 2002/0144136 A1* | 10/2002 | Stornetta, Jr. et al. |
| 2004/0082317 A1* | 4/2004 | Graefen |

FOREIGN PATENT DOCUMENTS

| | | | |
|---|---|---|---|
| EP | 0587950 A1 | 3/1994 |
| EP | 0746130 A1 | 5/1996 |

OTHER PUBLICATIONS

.nokiausa.com/quickguidehorizontal/0,2521,9000il,00. Nokia Connecting People 900I Quick Guide, 2001.

.techtv.com/produ...ectronics/story/0,23008,3319048,00 techtv, Apr. 2001.

.techtv.com/print/story/0,23102,3011446,00. products & reviews Samsung merges pda with phone, Mar. 2001.

.samsungelectronics.com/mobil...ss_terminals/gsm mobile phone wireless terminals internet in the palm of your hand, 2001.

.ericsson.com/WAP/products/mc_218. mobile companion mc 218, Sep. 28, 2001 submitted.

.fusionone.com/benefits/yourcalendars. fusionOne sync your address books and calendars, and you'll always be at the right place at the right time, Sep. 28, 2001.

.fusionone.com/benefits/youraddresss. fusionOne sync your mobile phone-and nothing can stop you from making the call, Sep. 28, 2001.

.handspring.com/pro.../ c/net handspring morphs its handheld into a cell phone, Sep. 2000.

http://call.click2talk.net2phone.com Free phone calls across the USA / Net 2 Phone.

* cited by examiner

September

| Contact | Mon | Tue | Wed | Thur | Fri | Sat | Sun |
|---|---|---|---|---|---|---|---|
| Townsend Brown 858-222-8181 | | | | | | | 1 |
| Charlie Humbucker 515-818-9099 | 2 | 3 | 4 | 5 9am- Bessie Smith 605-555-1212 | 6 | 7 | 8 |
| Robert Johnson 605-555-1234 | 9 | 10 | 11 | 12 | 13 | 14 | 15 |
| Mott Hoople 308-227-0277 | 16 | 17 | 18 | 19 | 20 | 21 | 22 |
| Gavrillo Princep 703-919-8713 | 23 | 24 | 25 | 26 | 27 | 28 | 29 |
| Bessie Smith 605-555-1212 | 30 | | | | | | |
| Jenny White 212-867-5309 | | | | | | | |

FIG. 3

PORTABLE ELECTRONIC DEVICE HAVING INTEGRATED TELEPHONY AND CALENDAR FUNCTIONS

DESCRIPTION OF THE DRAWING FIGURES

The numerous advantages of the present invention may be better understood by those skilled in the art by reference to the accompanying figures in which:

FIG. 3 is a diagram of a calendar in which a call-back may be scheduled in response to an incoming telephone call in accordance with the present invention.

DETAILED DESCRIPTION

Figure 1:
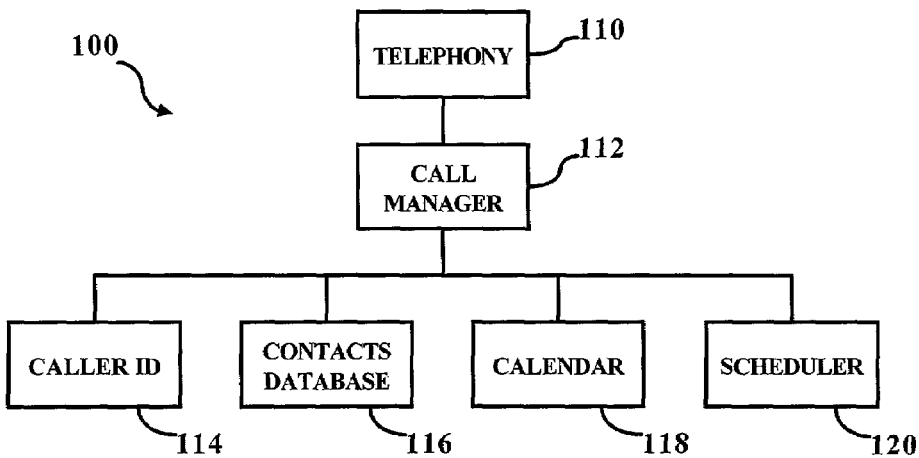
FIG. 1 is a block diagram of an electronic device system in accordance with the present invention.

Referring now to FIG. 1, a block diagram of an electronic device in accordance with the present invention will be discussed. Electronic device 100 includes a telephony module 110 for sending and receiving telephone call information, including voice and data, via a network with which electronic device 100 is capable of communicating. In one embodiment, for example, electronic device 100 is a cellular telephone that communicates with a cellular telephone network. Telephony communications are established and maintained via telephony module 110. Telephony module may include, for example, at least the basic telephone circuitry so that electronic device 100 is capable of functioning as a cellular telephone. Call manager module 112 is coupled with telephony module 110 for managing the handling of incoming and outgoing telephone calls received by and processed by telephony module 110. Call manager 112 communicates with caller ID module 114, contacts database 116, calendar 118, and scheduler 120. When an incoming telephone call is received by telephony module 110, caller ID module 114 determines the calling information associated with the incoming telephone call according to caller identification protocols. The calling information associated with the incoming telephone call includes, for example, the telephone number from which the incoming telephone call is placed, and the individual or company associated with the telephone number of the incoming telephone call. Call manager 112 compares the name and number associated with the incoming call with name and telephone numbers previously stored in contacts database 116. A contact record may be defined in one embodiment herein as including the name of a contact and one or more telephone numbers associated with that contact. For example, a contact record may include the name "Mike Smith" and a first telephone number, designated as a work number, and a second number designated as a cell phone number. When caller ID module 114 identifies the name and number associated with an incoming telephone call, call manager 112 looks for the associated name and number in contacts database 116. Call manager 112 can identify an associated contact record in contacts database 116 based on the name associated with the incoming telephone call, based on the number associated with the incoming telephone call or both. If no contact is identified in contacts database 116 that corresponds to the name or number of the incoming telephone call, the user has the option to add the name and or number associated with the incoming telephone call as a new contact in contacts database 116. Optionally, the user may edit a current contact record in contacts database 116 by adding a new telephone number for an existing contact person, by adding a new contact person associated with an existing contact telephone number, or by modifying a previously existing contact person or telephone number for an existing contact record, for example when a person changes his or her telephone number.

Once a contact associated with an incoming telephone call is identified, call manager 112 schedules a call-back for that contact in calendar 118. The scheduling of call-backs is implemented using a scheduler module 120 which may perform several functions including managing the input of a scheduled call-back into calendar 118, monitoring the time to determine when call-back reminders and call-backs should occur and for notifying the user accordingly, and for automatically initiating a call-back at the appropriate time. In one embodiment, a user may select to directly schedule a call-back in calendar 118 without associating the incoming telephone call information with a contact record in contacts database, and without saving the incoming call information to a contacts record. In this example, the call information is directly entered into the calendar 118 and is used to schedule a call-back. In any event, at the appropriate time as determined by scheduler 120, the telephone number for the call-back stored in calendar 118 is called, either automatically or by first prompting a user that a call-back is about to be initiated. The user may be prompted, for example, to go ahead with the call-back at this time, to delay the call-back to some future time (e.g., 15 minutes, 1 hour, etc.), or to cancel the call-back.

Figure 2:
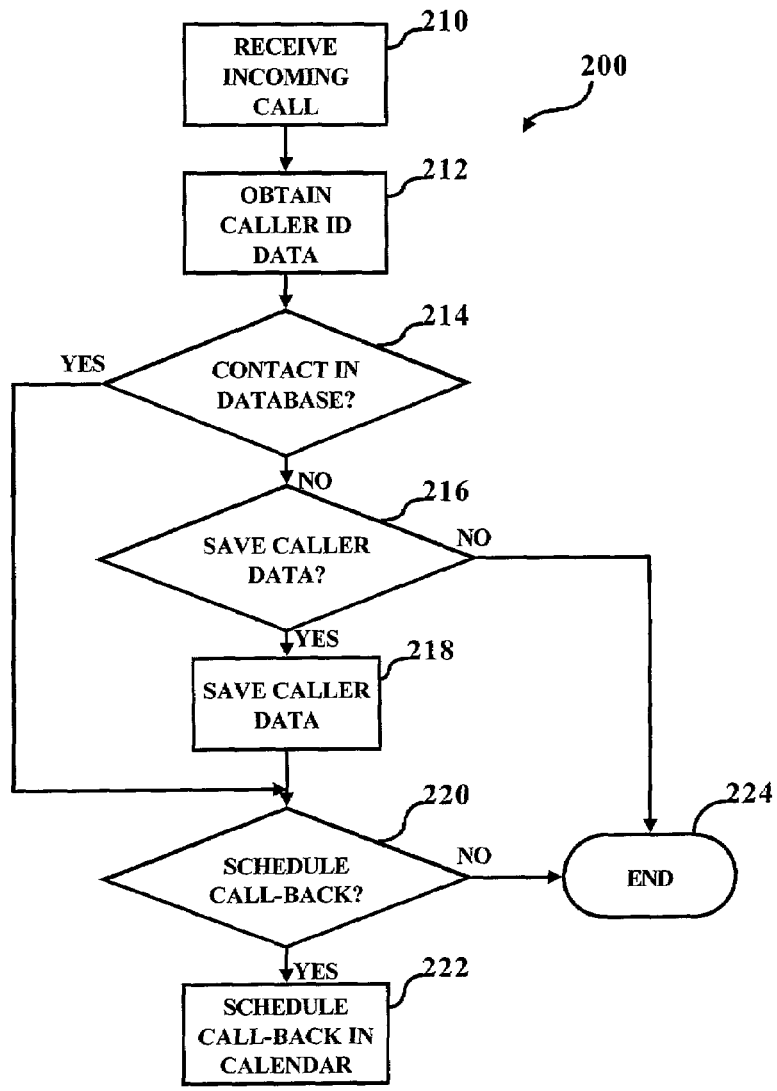
FIG. 2 is a flow chart of a method for operating an electronic device in accordance with the present invention.

Referring now to FIG. 2, a flow chart of a method for scheduling a call-back in accordance with the present invention will be discussed. The steps of method 200 can be implemented by software running on electronic device 100 where the software program configures the hardware of electronic device to implement the functions of one or more of telephony module 110, call manager 112, caller ID module 114, contacts database 116, calendar 118, and scheduler 120 in conjunction with the associated hardware. When an incoming telephone call is received by telephony module 110 at step 210, the telephony information is passed to call manager 112 for control and handling of the telephone call information. Caller identification (caller ID) information is passed from call manager 112 to caller ID module 114, which processes the caller ID information contained in the incoming telephone information. Caller ID module 114 at step 212 obtains the telephone number of the incoming call and the name of the caller when such information is provided in the incoming telephone signal. In one embodiment, call manager 112 automatically saves the telephone number and name of the caller in a contacts database 116. Using matching and comparing routines, numbers already stored in contacts database 116 need not be saved additional times once the name and telephone number of a contact is already stored in contacts database. Thus, a determination is made at step 214 whether the caller ID information is already stored in a contact record in contacts database 116. In one example, when an incoming phone call is received, the user of electronic device 100 can answer the telephone call and carry out a conversation with the caller. At the end of the call, the user is prompted via a dialog box or other similar means whether the user would like to save the phone number and caller name information at step 216. If not, the call ends at step 224. If yes, the information can be stored in contacts database 116. The user will not be asked to save the name and number in the event this information is already stored in contacts database 116 as determined at step 214. If the user would like to store the caller data, the name and telephone number corresponding to the incoming caller is stored as a contact record in contacts database 116 at step 218. The user also can have the option of editing the name and number information if the caller ID information determined by caller ID module 114 is incorrect, outdated, incomplete, corresponds to another person, etc. As an option, the user may also enter additional notes for the caller where the notes are stored and associated with the contact record for the saved name and number information. After the name and number information is saved in contacts database 116, the user is prompted at step 220 whether the user would like to schedule a call back for the recent caller. If yes, then a call-back appointment is scheduled in calendar module 118 at step 222, and a call-back reminder is generated and monitored by scheduler 120. Otherwise, the call ends at step 224. At the scheduled time, scheduler module 120 prompts the user whether the user would like to proceed with the scheduled call-back. If so, then call manager 112 initiates telephony module 110 to automatically dial the number associated with the scheduled call-back. Alternatively, the user may optionally select to delay the call-back for a predetermined amount of time (e.g., 15 minutes, 30 minutes, etc.), or alternatively to cancel the scheduled call-back. As one option, the user can set electronic device 100 so that scheduler 120 will automatically initiate dialing of the number scheduled for call back. In such an embodiment, the user may then decide to cancel the call-back before the automatic call-back process has been completed.

Referring now to FIG. 3, a calendar in which one or more call-backs may be scheduled in accordance with the present invention will be discussed. As an example, a calendar display 300 for the month of September is shown in which the data of calendar 118 is displayed. Contact records 310 of contacts database 116 are optionally displayed along with calendar display 300 to show a list of contact records and so that a user may access the contact records 310 as needed. For contact records 310 stored in contacts database 116, the name and telephone number associated with each contact record may be displayed. As one optional feature of the invention, a first type of selection action, for example left-clicking or similar action, when a cursor selects a contact record of contacts database 116 will cause telephony module 110 to automatically dial the number associated with the selected contact record. Another type of selection action, such as right clicking or similar action, will allow a call to that contact to be scheduled in calendar 118. Calls that are scheduled for calling or call-back in calendar 118 are shown for the corresponding day. For example, on September 5, a 9 am call to contact Bessie Smith and the telephone number to be called are shown in calendar 118 in the calendar box for September 5 in calendar display 300. A user may select the stored call as shown in calendar display 300 in order to optionally execute one or more additional functions. For example, by selecting the call record, the user may cancel or reschedule the call-back, change reminder attributes such as type of alarm or reminder that scheduler 120 provides to the user. In addition, another window or box may be displayed in calendar display 300 to show any notes or other text associated with the call, and to allow modification of that text as needed. The user can optionally select whether or not the area code or other needed dialing information or characters (pauses, pound key #, asterisk *, etc.) are dialed when the scheduled call-back is executed.

Figure 4:
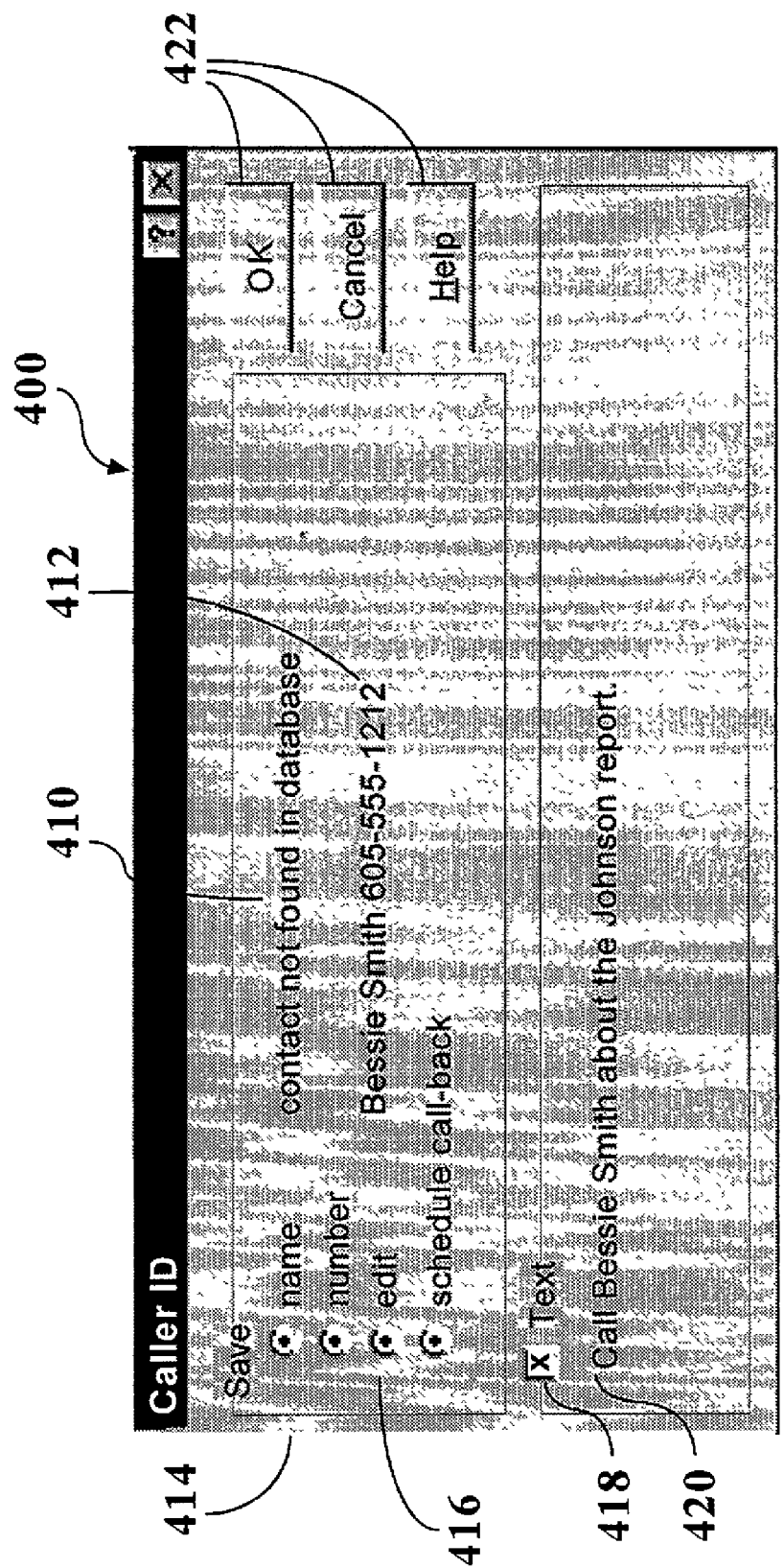
FIG. 4 is a dialog box illustrating caller identification information for an incoming telephone call and further illustrating an option to schedule a call-back in accordance with the present invention.

Referring now to FIG. 4, a caller ID dialog box for allowing a user to schedule a call-back in response to an incoming or outgoing call will be discussed. Dialog box 400 may be displayed by call manager 112 to allow a user to decide an appropriate action based on caller ID data determined by caller ID module 114. Caller ID module 114 provides information indicating whether or not the contact was found in contacts database by call manager 112 at location 410. The call information for the incoming call is displayed at location 412. The save options for the incoming telephone call are displayed at location 414. In the example shown in FIG. 4, the user has the option to save the name and number of the call information associated with the incoming call as determined by caller ID module 114. These events can be executed by selecting one of the one or more appropriate radio buttons 416 for the corresponding action, for example where the user checks the radio button for each event the user desires to execute corresponding action. The user also has the option to edit the information before saving, and to schedule a call-back for the person and/or telephone number associated with the incoming telephone call and as displayed at location 412. In addition, the user may store any notes or other text by highlighting the text select box 418 and entering desired text associated with the call-back at location 420. After the user is finished with dialog box 400, the user may dispose of dialog box 400 by selecting an appropriate action button 422. It should be noted that caller ID dialog box 400 may be optionally displayed or not displayed automatically in response to an incoming telephone call received by telephony module 110. The user may choose to answer the incoming telephone call, and then decide whether or not to schedule a call-back at the end of the call using dialog box 400. Alternatively, the user may choose not to answer the incoming telephone call, and then schedule a call-back to the user for returning the unanswered telephone call. In an alternative embodiment, the user can choose to not have dialog box 400 be displayed automatically in response to an incoming telephone call. In this alternative embodiment, the user has the option to manually generate a call-back after handling an incoming telephone call, for example if after the completion of the telephone call the user desires to manually generate a call-back. When this occurs, caller ID dialog box 400 displays the call information for the last incoming call. Alternatively, the user can user caller ID dialog box 400 to scroll through a list of incoming or outgoing phone calls, as the case may be for example where all incoming and outgoing calls are logged, and schedule a call-back for any one or more of the previous calls. In addition, as discussed, above, a user may also optionally schedule a call-back in calendar 118 for any desired person or telephone number by either using contact information from a contact record stored in contacts database 116, or by manually entering the telephone number and/or contact person information directly into calendar 118 using scheduler module 120. It should be noted that the term telephony and telephony manager 110 may be substituted with any network information and associated hardware and/or software to modify electronic device 100 to handle call-backs for associated persons or devices on a network. In such a case, telephone number as used herein can include e-mail address, IP address, etc. so that a call-back or other return communication can be scheduled based on an incoming e-mail message or other type of network communication not necessarily limited to telephony communications per se. Thus, the term call-back is not intended to be limited to telephone calls and may encompass other media and other means for communicating or responding with or to any device or any person, for example by e-mail, Internet Protocols, by file transfer protocols, other network protocols, etc. Such modifications of electronic device 100 can be made after having the benefit of this disclosure without departing from the spirit or scope of the invention and without providing substantial change thereto.

Figure 5:
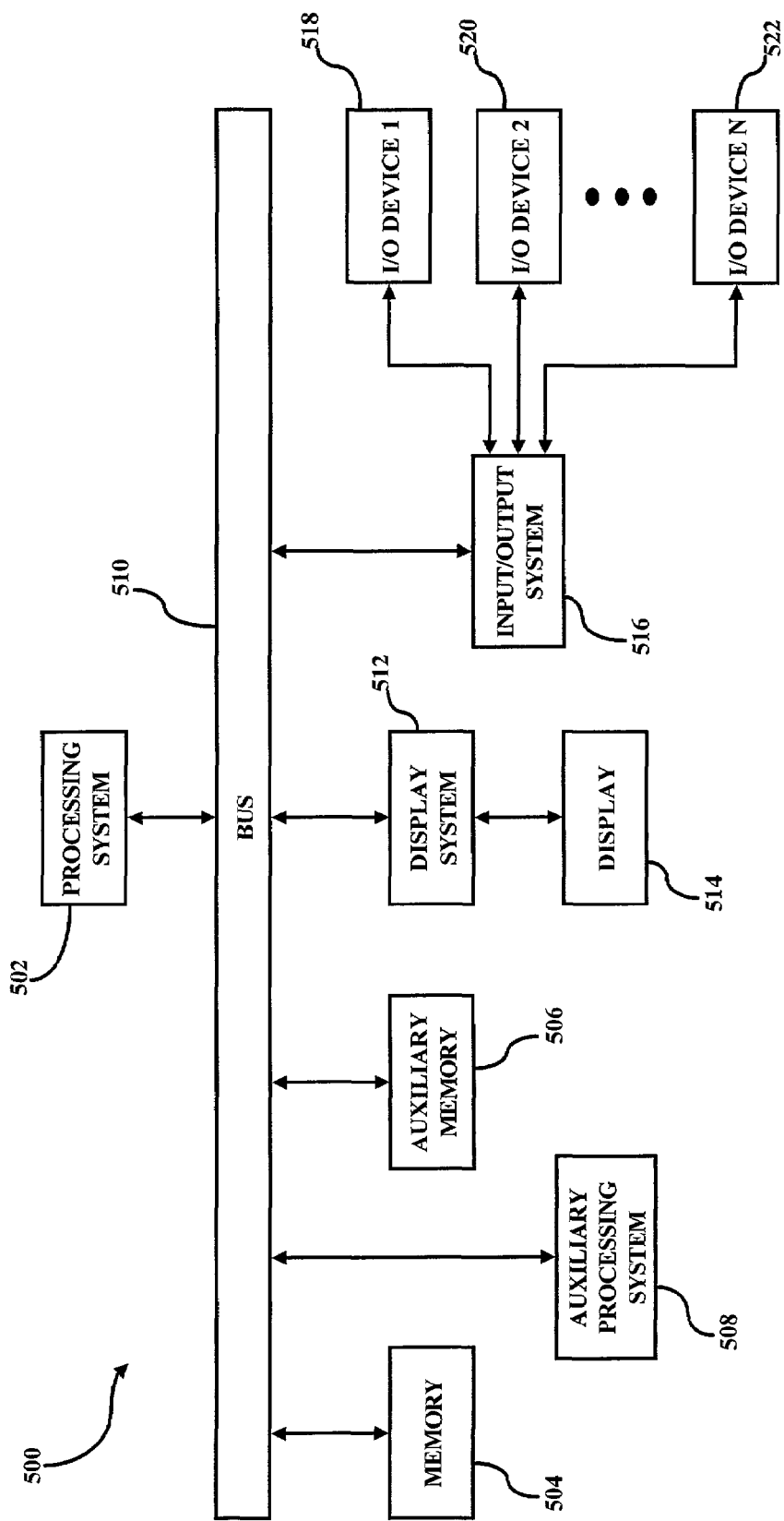
FIG. 5 is a block diagram of an electronic information appliance for tangibly implementing at least one embodiment of the present invention.

Referring now to FIG. 5, a block diagram of a hardware system for an information appliance in accordance with the present invention will be discussed. Information appliance 500 can be used to tangibly embody electronic device 100 by providing hardware components as needed for hardware embodiments of electronic device 100, which may include for example cellular telephones, personal computers, network appliances, home or office telephones, central offices, central network systems, server systems, and so on. In the exemplary embodiment illustrated in FIG. 5, the hardware system 500 is controlled by a central processing system 502. The central processing system 502 includes a central processing unit such as a microprocessor or microcontroller for executing programs, performing data manipulations and controlling the tasks of the hardware system 500. Communication with the central processor 502 is implemented through a system bus 510 for transferring information among the components of the hardware system 500. The bus 510 may include a data channel for facilitating information transfer between storage and other peripheral components of the hardware system. The bus 510 further provides the set of signals required for communication with the central processing system 502 including a data bus, address bus, and control bus. The bus 510 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of the hardware system 500 include main memory 504, and auxiliary memory 506. The hardware system 500 may further include an auxiliary processing system 508 as required. The main memory 504 provides storage of instructions and data for programs executing on the central processing system 502. The main memory 504 is typically semiconductor-based memory such as dynamic random access memory (DRAM) and/or static random access memory (SRAM). Other semi-conductor-based memory types include, for example, synchronous dynamic random access memory (SDRAM), Rambus dynamic random access memory (RDRAM), ferroelectric random access memory (FRAM), and so on. The auxiliary memory 506 provides storage of instructions and data that are loaded into the main memory 504 before execution. The auxiliary memory 506 may include semiconductor based memory such as read-only memory (ROM), programmable read-only memory (PROM), erasable programmable read-only memory (EPROM), electrically erasable read-only memory (EEPROM), or flash memory (block oriented memory similar to EEPROM). The auxiliary memory 506 may also include a variety of non-semiconductor-based memories, including but not limited to magnetic tape, drum, floppy disk, hard disk, optical, laser disk, compact disc read-only memory (CD-ROM), write once compact disc (CD-R), rewritable compact disc (CD-RW), digital versatile disc read-only memory (DVD-ROM), write once DVD (DVD-R), rewritable digital versatile disc (DVD-RAM), etc. Other varieties of memory devices are contemplated as well. The hardware system 500 may optionally include an auxiliary processing system 508 which may be an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the main processor.

The hardware system 500 further includes a display system 512 for connecting to a display device 514, and an input/output (I/O) system 516 for connecting to one or more I/O devices 518, 520, and up to N number of I/O devices 522. The display system 512 may comprise a video display adapter having all of the components for driving the display device, including video memory, buffer, and graphics engine as desired. Video memory may be, for example, video random access memory (AM), synchronous graphics random access memory (SGRAM), windows random access memory (WRAM), and the like. The display device 714 may comprise a cathode ray-tube (CRT) type display such as a monitor or television, or may comprise an alternative type of display technology such as a projection-type CRT display, a liquid-crystal display (LCD) overhead projector display, an LCD display, a light-emitting diode (LED) display, a gas or plasma display, an electroluminescent display, a vacuum fluorescent display, a cathodoluminescent (field emission) display, a plasma-addressed liquid crystal (PALC) display, a high gain emissive display (HGED), and so forth. The input/output system 516 may comprise one or more controllers or adapters for providing interface functions between the one or more I/O devices 518-522. For example, the input/output system 516 may comprise a serial port, parallel port, universal serial bus (USB) port, IEEE 1394 serial bus port, infrared port, network adapter, printer adapter, radio-frequency (RF) communications adapter, universal asynchronous receiver-transmitter (UART) port, etc., for interfacing between corresponding I/O devices such as a keyboard, mouse, trackball, touchpad, joystick, trackstick, infrared transducers, printer, modem, RF modem, bar code reader, charge-coupled device (CCD) reader, scanner, compact disc (CI)), compact disc read-only memory (CD-ROM), digital versatile disc (DVD), video capture device, TV tuner card, touch screen, stylus, electroacoustic transducer, microphone, speaker, audio amplifier, etc. The input/output system 716 and I/O devices 518-522 may provide or receive analog or digital signals for communication between the hardware system 500 of the present invention and external devices, networks, or information sources. The input/output system 516 and I/O devices 518-522 preferably implement industry promulgated architecture standards, including Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of the hardware system 500 of FIG. 5 by one having ordinary skill in the art would not depart from the scope or the spirit of the present invention, and without providing substantial change thereto.

The invention provides cross-functional features between devices having the ability to provide communications and additional features, for example telephony and calendar functions. Additional features may be provided using these cross-functional features. For example, telephone numbers of a contact record in contacts database 116 can be given the same quality as an Internet link. When a telephone number is set up as a link, the telephone number can be underlined to indicate that it is a link such as shown in contacts display 310 of FIG. 3. Alternatively, a telephone number can be indicated as a link via italics, in a different color font, etc. Clicking or selecting a Linked telephone number causes electronic device 100 to automatically dial the telephone number or otherwise initiate a communication. In addition, telephone numbers can be attached to e-mails where electronic device is adapted to receive e-mail communications, such as an Internet enabled cellular telephone or portable digital appliance or personal digital assistant (PDA). Clicking or otherwise selecting the telephone number in the e-mail can also initiate an automatic dialing sequence for the telephone number. As another example, Internet yellow pages or other directories can be searched so that telephone numbers in the search results can be automatically dialed, saved as a contact record in contacts database 116, or scheduled for a call or a call-back. Telephone numbers and contact names can be dragged and dropped from contact display 310 onto calendar display 300 so that a call or a call-back is scheduled in calendar 118 for the desired date and time so that telephonic appointments or other communication method appointments may be scheduled. Call manager 112 can track all incoming and outgoing telephone calls and other communications so that a log of all communications are logged, or those that are specified by the user, for example where only incoming calls are logged, only outgoing calls are logged, logging only calls from a list or group of contacts, and so on. From this information, a calendar diary can be generated, for example to prepare reports for a predetermined time period. The notes entered with the text field 420 can be optionally displayed on the report as desired by the user. Additionally, electronic device may also schedule Internet communications and meetings using one or more audio or visual communications means. For example, a user may participate in a networked meeting using telephony communications, network protocol communication such as a packet switched network such as the Internet. Telephony module may be adapted to communicate over a network such as the Internet so that in response to a first communication over the network, the user can schedule a call-back for a telephonic or on-line network medium, using voice communication or video communications where electronic device is adapted to include a video camera, for example as one of N number of I/O devices 518, 520, and 522.

It is understood that the specific order or hierarchies of steps in the methods disclosed herein are examples of exemplary approaches. Based upon design preferences, it is understood that the specific order or hierarchy of steps in the method can be rearranged while remaining within the scope of the present invention . The attached method claims present elements of the various steps in a sample order, and are not meant to be limited to the specific order or hierarchy presented.

Although the invention has been described with a certain degree of particularity, it should be recognized that elements thereof may be altered by persons skilled in the art without departing from the spirit and scope of the invention and without providing substantial change thereto. It is believed that the portable electronic device having integrated telephony and calendar functions of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. An apparatus, comprising:
   a telephony circuit structure, disposed within a first device, configured to receive an incoming telephone call and enable a user of the first device to speak to an initiator of the incoming telephone call;
   a caller ID circuit structure, disposed within the first device, configured to identify caller information associated with the incoming telephone call; and
   a scheduling circuit structure, disposed within the first device, configured to enable the user to schedule a call-back based on the identifying caller information identified by said caller ID circuit structure; and
   a reminder circuit structure disposed within the first device and configured to initiate a call-back scheduled by the scheduling circuit structure;
   wherein said scheduling circuit structure is configured to require, upon receiving the incoming telephone call and after said identifying caller information for the incoming telephone call is provided to the user upon receipt of the incoming telephone call, an indication from the user that a call-back should be scheduled.

2. An apparatus as claimed in claim 1, wherein said scheduling circuit structure includes an electronic calendar.

3. An apparatus as claimed in claim 1, wherein said scheduling circuit structure includes a scheduler module.

4. An apparatus as claimed in claim 1, further comprising a call management circuit structure disposed within the first device and being coupled with said telephony circuit structure, said caller ID circuit structure, and said scheduling circuit structure.

5. An apparatus as claimed in claim 1, the first device being selected from the group comprising a cellular telephone, a home telephone, and a work telephone.

6. An apparatus as claimed in claim 1, further comprising a storage circuit structure configured to store the identified caller information associated with the incoming telephone call.

7. An apparatus as claimed in claim 6, said storing means including a contacts database.

8. The apparatus of claim 1, wherein the first device comprises a portable handheld device.

9. The apparatus of claim 8, wherein the scheduling circuit structure enables a user of the portable device, after receiving the incoming call, to, at the option of the user, automatically schedule a call-back.

10. The apparatus of claim 1, wherein the scheduling circuit structure enables a user of the first device to, at the direction of the user and based on a selection by the user after receiving the incoming call, automatically schedule a call-back.

11. The apparatus of claim 1, further comprising a prompting circuit structure within the first device and configured to prompt the user to approve of the call back prior to initiation of the call back.

12. A method for enabling a recipient of an incoming telephone call to schedule a call-back, comprising:
   receiving an incoming telephone call by a first device;
   obtaining caller information associated with the incoming telephone call by the first device;
   providing the caller information associated with the incoming telephone call by the first device to a recipient of the incoming call; and
   requesting from the recipient of the incoming call, after receiving the incoming call and providing the caller information to the recipient of the incoming call, an indication of whether the first device should initiate an automatic scheduling of a call-back for the incoming telephone call by the first device based on the caller information provided to the recipient.

13. A method as claimed in claim 12, further comprising the step of determining whether obtained caller information associated with the incoming telephone call is stored in a database, and if not, then saving the obtained caller information in the database.

14. A method as claimed in claim 12, further comprising the step of, at a time scheduled in said scheduling step, initiating a call-back based using the obtained caller information.

15. A method as claimed in claim 12, said scheduling step further comprising the step of optionally entering text associated with the scheduled call-back.

16. A method as claimed in claim 12, further comprising the step of, at a scheduled call-back time, prompting the user to select an option to be executed, the option being at least one of the following from the group comprising proceeding with a scheduled call-back, canceling a scheduled call-back, delaying a scheduled call-back, and rescheduling a scheduled call-back.

17. A method as claimed in claim 12, wherein the enabling step further comprises, after the incoming call is received, requiring the recipient to indicate that a call-back should be scheduled for the incoming telephone call before any scheduling of a call-back.

18. A method as claimed in claim 12, wherein the enabling step further comprises, after the incoming call is received, requesting from the recipient an indication that a call-back should be scheduled for the incoming telephone call before any scheduling of a call-back.

19. An apparatus, comprising:
   means for receiving an incoming communication;
   means for identifying information associated with the incoming communication;
   means for presenting the identifying information to a recipient of the incoming communication; and
   means for requesting the recipient of the incoming communication to indicate, after receiving the incoming communication and presenting the identifying information to the recipient, whether to automatically schedule a response to the incoming communication based on information identified by said identifying means.

20. An apparatus as claimed in claim 19, the incoming communication received by said receiving means being selected from the group comprising telephony, e-mail, network protocol, file transfer protocol, Internet protocol, wireless network protocol, RF network protocol.

21. An apparatus as claimed in claim 19, said receiving means being selected from the group comprising cellular telephone, home telephone, work telephone, computer system, network adapter, and server.

22. An apparatus as claimed in claim 19, said identifying means including a structure selected from the group comprising caller ID, network adapter, firewall software, firewall hardware, network hardware, and network software.

23. An apparatus as claimed in claim 22, said scheduling means including an electronic calendar.

24. An apparatus as claimed in claim 22, said scheduling means initiating a response communication at a scheduled time.

* * * * *